Patented June 1, 1943

2,320,694

UNITED STATES PATENT OFFICE 2,320,694

VAT DYESTUFF OF THE ANTHANTHRONE SERIES

Werner Zerweck and Rudolf Müller, Frankfort-on-the-Main-Fechenheim, and Kurt Bähr, Leverkusen I. G. Werk, Germany, assignors to General Aniline & Film Corporation, New York, N. Y., a corporation of Delaware No Drawing. Application June 14, 1940, Serial No. 340,546. In Germany June 27, 1939

3 Claims. (Cl. 260—359)

Our present invention relates to vat dyestuffs of the anthanthrone series, more particularly to those of the general formula:

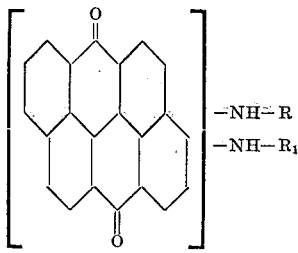

wherein one of R and $R_1$ stands for the anthraquinone radicle and the other for the radicle of an aroylaminoanthraquinone.

U. S. Patent 1,880,440 describes and claims vat dyestuffs of the anthanthrone series obtained by condensing a halogenated anthanthrone with an amino-anthraquinone or a derivative or substitution product thereof in the presence of an agent for combining with acid and a small quantity of a catalytically acting substance, such as copper or a copper compound or copper salt. By this means in the molecule of the halogen-anthanthrones or their derivatives the halogen atoms are wholly or in part replaced by the radicles of aminoanthraquinones or their derivatives.

According to our present invention condensation products of the anthanthrone series which contain the radicles of two different aminoanthraquinones in the molecule are obtained by acting with mixtures of equimolecular amounts of an aminoanthraquinone and a monoaroylated diaminoanthraquinone on halogenanthanthrones containing two halogen atoms in the molecule. The condensation is performed in the usual manner by heating the components in high-boiling solvents with the addition of acid-binding agents such as for example sodium or potassium carbonate or sodium acetate, and in the presence of copper or a copper compound including copper salts.

The course of the reaction is surprising, since it could not be foreseen that in this way condensation products would be obtained which contain two different aminoanthraquinone radicles in the molecule. It would have been expected that mixtures of two symmetrical condensation products as described in U. S. Patent 1,880,440 or also mixtures thereof with asymmetrical condensation products would be formed. Contrary thereto compounds of the aforesaid formula are obtained in a uniform or practically uniform reaction and in good purity.

The new compounds thus obtained are valuable vat dyestuffs, dyeing vegetable fibers mostly in blue to grey shades. The dyestuffs are distinguished by their ability to be absorbed equally on the fiber, even on mixed fabrics. The dyeings thus obtained exhibit excellent fastness properties and surpass the dyeings obtained by means of the dyestuffs prepared according to U. S. Patent No. 1,880,440 by better fastness to boiling with alkaline solutions, bucking, mercerising and ironing.

In order to further illustrate our invention the following example is given, the parts being by weight and all temperatures in degrees centigrade.

Example 4.64 parts of 2.7-dibromo-anthanthrone are introduced at about 200° into a mixture of 200 parts of naphthalene or nitrobenzene, 3.42 parts of 1-benzoylamino-4-aminoanthraquinone, 2.23 parts of 1-aminoanthraquinone, 3.9 parts of sodium carbonate, 8 parts of sodium acetate and 0.6 part of cuprous chloride. The mixture is heated for about 4 to 6 hours at 200 to 210°. Thereupon it is diluted with solvent naphtha or other appropriate solvent and filtered off while hot. After removal of the solvent by means of ethyl alcohol the residue formed is freed from inorganic impurities by means of dilute hydrochloric acid. Then the new dyestuff thus obtained of the formula:

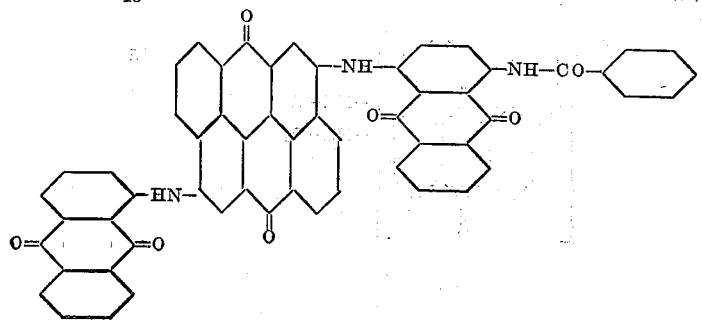

is filtered off, washed with water and dried. It crystallizes from high-boiling solvents such as for example chloronaphthalene in blue needles, soluble in concentrated sulfuric acid with an olive green color, and dyes cotton from a dark red vat bluish-grey shades of excellent fastness properties.

When replacing the aforesaid 1-benzoylamino - 4 - aminoanthraquinone by the same amount of 1-benzoylamino-5-aminoanthraquinone the formed isomeric dyestuff of the formula:

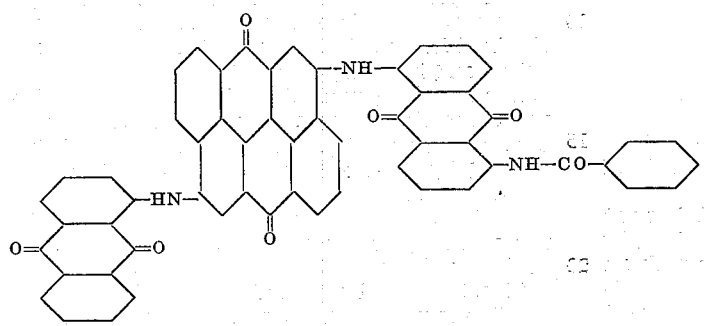

dissolves in concentrated sulfuric acid with a yellowish olive color and dyes cotton from a dark red vat bluish grey shades of a somewhat more reddish tint.

We claim:
1. Vat dyestuffs of the anthanthrone series of the formula

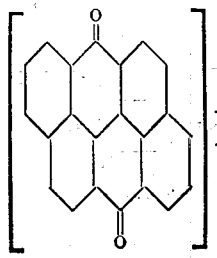

wherein one of R and $R_1$ stands for the anthraquinone radicle and the other for the radicle of a benzoylamino-anthraquinone, which dyestuffs dye the vegetable fibers mostly blue to grey shades of excellent fastness properties, which dyestuffs are distinguished by their ability to be absorbed equally on the fiber, even on mixed fabrics.

2. A vat dyestuff of the anthanthrone series of the formula:

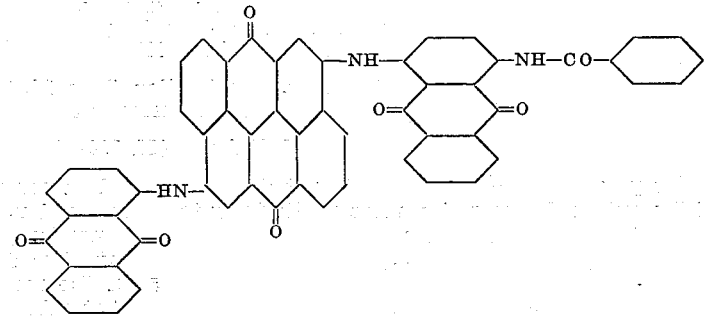

which dyestuff is soluble in concentrated sulfuric acid with an olive green color, and dyes cotton from a dark red vat bluish-grey shades of excellent fastness properties.

3. A vat dyestuff of the anthanthrone series of the formula:

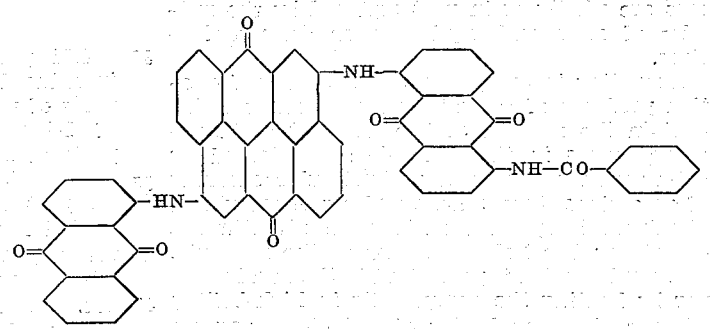

which dyestuff is soluble in concentrated sulfuric acid with a yellowish olive color and dyes cotton from a dark red vat bluish grey shades of a somewhat reddish tint.

WERNER ZERWECK.
RUDOLF MÜLLER.
KURT BÄHR.